United States Patent
Ashton

(10) Patent No.: US 7,027,380 B2
(45) Date of Patent: Apr. 11, 2006

(54) ATOMIC RESOLUTION STORAGE DEVICE

(75) Inventor: Gary R. Ashton, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 497 days.

(21) Appl. No.: 10/137,784

(22) Filed: May 2, 2002

(65) Prior Publication Data

US 2003/0206512 A1 Nov. 6, 2003

(51) Int. Cl.
*G11B 9/00* (2006.01)

(52) U.S. Cl. ..................................... 369/126

(58) Field of Classification Search ................ 369/101, 369/126, 275.3, 111
See application file for complete search history.

(56) References Cited

U.S. PATENT DOCUMENTS

| | | | |
|---|---|---|---|
| 5,557,596 A | | 9/1996 | Gibson et al. |
| 6,735,163 B1 | * | 5/2004 | Marshall ..................... 369/126 |
| 6,775,223 B1 | * | 8/2004 | Eldredge et al. ............ 369/126 |

OTHER PUBLICATIONS

C.A. Spindt et al., "Physical Properties of Thin-Film Field Emission Cathodes with Molybdenum Cones," Journal of Applied Physics, vol. 47, No. 12, pp. 5248-5263 (Dec. 1976).

E. Huber et al., "Laser-Induced Crystallization of Amorphous GeTe: A Time-Resolved Study," Physics Review B, vol. 36, No. 3, pp. 1595-1604 (Jul. 15, 1987).

R.T. Howe et al., "Silicon Micromechanics: Sensors and Actuators on a Chip," IEEE Spectrum, pp. 29-35 (Jul. 1990).

V.P. Jaecklin et al., "Novel Polysilicon Comb Actuators for XY-Stages", Proceedings of Micro Electro Mechanical Systems, pp. 147-149 (Feb. 1992).

G.W. Jones et al., "Silicon Field Emission Transistors and Diodes," IEEE Trans. on Components, Hybrids and Manufacturing Technology, vol. 15, No. 6, pp. 1051-1055 (Dec. 1992).

"Electron Beam-Induced Information Storage in Hydrogenated Amorphous Silicon Devices," B. G. Yacobi, pp. 695-697, Appl. Phys. Lett. 44 (7), Apr. 1, 1984.

"Erasable Phase-Change Optical Materials," Noboru Yamada, pp. 48-50, MRS Bulletin/Sep. 1996.

"Overwritable Phase-Change Optical Disk Recording", Takeo Ohta, Kenichi Nagata, Isao Satoh and Ryoich Imanaka, pp. 426-431, IEEE Transactions on Magnetics, vol. 34, No. 2, Mar. 1998.

* cited by examiner

*Primary Examiner*—Nabil Hindi

(57) ABSTRACT

A storage device and a storage system employing the storage device. In one embodiment, the storage devices include an electron emitter and a storage medium in close proximity to the electron emitter. The storage medium includes a phase change material. A read signal detector capable of detecting light is provided in communication with the storage medium.

25 Claims, 4 Drawing Sheets

ATOMIC RESOLUTION STORAGE DEVICE

FIELD OF THE INVENTION

The present invention relates generally to storage devices, and more particularly to storage devices based on electron emitters.

BACKGROUND OF THE INVENTION

For decades, researchers have been trying to increase the storage density and reduce the cost/storage in information storage devices, such as magnetic hard-drives, optical drives, and DRAM. However, it has become increasingly difficult to squeeze more information into the storage devices. Moreover, conventional technologies to make those devices may be approaching fundamental limits on storage density.

Many scientists have proposed alternative approaches to increase the storage density. One approach is based on Scanned Probe Microscopy (SPM) technologies. Typically, in such an approach, a probe is positioned extremely close to a storage medium. For example, in one implementation of Atomic Force Microscopy, the probe physically touches the medium; in Scanning Tunnelling Microscopy (STM), the probe is within a few nanometers of the medium to ensure that the probe is within tunnelling range of the medium. It is difficult to inexpensively build a storage system with a probe in contact with or in such extremely close proximity to the medium without, eventually, damaging or effacing the surface of the medium or the probe. Moreover, in STM, the nanometer spacing must be precisely controlled. This is a difficult task. Some researchers have found methods to eliminate the need for such extremely close proximity. One technique is based on Near-Field Scanning Optical Microscopy. However, this technique has limited lateral resolution and bandwidth. Other techniques are based on non-contact Scanning Force Microscopy, which typically suffers from poor resolution and poor signal to noise ratio.

Even if one has increased the storage density, one still has to overcome another major hurdle, which is the time required to access the information. The storage device's utility is limited if it takes a long time to retrieve the stored information. In other words, in addition to high storage density, one must find a way to quickly access the information.

It should be apparent from the foregoing that there is still a need for a storage device that is based on a non-conventional approach, with significantly increased storage density, and low cost/storage. Additionally, the storage device preferably should have fast access times and high data rates. Furthermore, the storage device should preferably eliminate the requirement for extremely close proximity between the probe and storage medium.

U.S. Pat. No. 5,557,596 to Gibson et al. discloses a ultra-high density storage device. The storage device includes many field emitters in close proximity to a storage medium, and a micromover for moving the storage medium relative to the field emitters. In one embodiment, the storage medium uses a heterojunction diode. Information is read from the storage device by generating a signal current from the storage area bombarded by the electron beam current, wherein the magnitude of the signal current depends on the state of the storage area. One known problem with this approach is the difficulty to create a good phase change to silicon heterojunction for device operation.

SUMMARY OF THE INVENTION

The present invention provides a storage device and a storage system employing the storage device. In one embodiment, the storage devices includes an electron emitter and a storage medium in close proximity to the electron emitter. The storage medium includes a phase change material. A read signal detector capable of detect is provided in communication with the storage medium.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
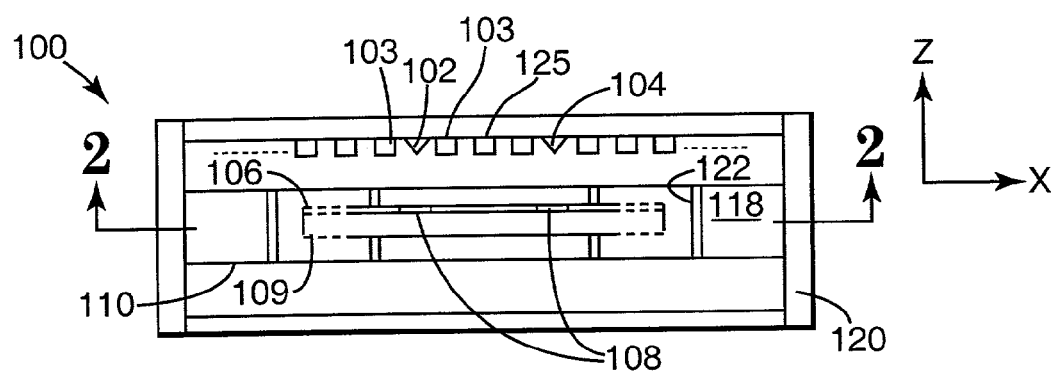
FIG. 1 is cross-section view illustrating one embodiment of a storage device according to the present invention having a storage medium in communication with a photodiode structure.

FIG. 1 is a side cross-sectional view illustrating one exemplary embodiment of a storage device 100 according to the present invention. The storage device 100 includes a cathodoluminescence read signal detector in communication with a storage medium made of a phase change material. In various embodiments described herein, the cathodoluminescence read signal detector includes a photodiode. Other cathodoluminescence read signal detectors may be apparent to one skilled in the art after reading this application. During a read operation, the storage device provides a cathodoluminescence signal detectable by the photodiode representative of the information stored on the storage medium.

Atomic resolution storage device 100 includes a nonvolative memory component employing a plurality of electron emitters, one or more medium surfaces and one or more micromovers. In one embodiment, each electron emitter is positioned near an associated partitioned area on the medium surface. The corresponding micromover provides for movement of the electron emitter relative to the medium surface to aid in the redundant reading and writing of data at multiple partitioned areas on the medium surface. In one aspect, the micromover is attached to the corresponding partitioned area of the medium and the corresponding electron emitter is held stationary, for movement of the medium relative to the electron emitter.

Each atomic resolution storage device used in the present invention is small in size, has low power requirements and provides for non-volatile, high density storage of data. The term "atomic resolution storage device" as used herein, is defined as a non-volatile memory storage device or component capable of storing a large volume of data, such as megabytes to gigabytes of data points, within a relatively small storage area and requiring very low power consumption. Each atomic resolution storage device includes a plurality of electron emitters, one or more storage mediums, and one or more micromovers and associated circuitry for the redundant reading and writing of data at the storage medium. The terms medium and media are used interchangeably herein when used in reference to a storage area. In one preferred embodiment, each atomic resolution storage device includes a plurality of spaced apart electron emitters, wherein each electron emitter is responsible for a number of storage areas on the storage medium. Electron emitters include flat emitters and tipped emitters. Other electron emitter types may become apparent to one skilled in the art after reading the present application. In one embodiment, the atomic resolution storage device is less than one centimeter wide by one centimeter high by less than two millimeters long, having a data storage capability of hundreds of megabytes to hundreds of gigabytes and power requirement of less than one watt (instantaneous) and tenths of milliwatts (standby). Each separate, partitioned storage area is capable of storing gigabytes of data, independent of other storage areas.

In FIG. 1, storage device 100 includes a number of electron emitters, such as electron emitters 102 and 104, storage medium 106 including a number of storage areas, such as storage area 108, photodiode 109 and micromover 110. Micromover 110 scans storage medium 106 with respect to the electron emitters or vice versa. In one preferred embodiment, each storage area is responsible for storing one bit of information. Storage medium 106 is made of a phase change semiconductor material or other material showing cathodoluminescence. Photodiode 109 is in communication with storage medium 106. During a read operation, the photodiode is used to detect the cathodoluminescence signal produced when an electron beam from one of the emitters hits the storage medium 106. The magnitude and/or power density of the cathodoluminescence signal is representative of information stored on the storage medium 106. A similar storage device without a photodiode in communication with a storage medium made of phase change material is described in the Gibson et al. U.S. Pat. No. 5,557,596, which is herein incorporated by reference.

In one embodiment, electron emitters 102 and 104 are point emitters having relatively sharp points. Alternatively, other electron emitters may be used (e.g., flat or planar electron emitters). Each point emitter may have a radius of curvature in the range of approximately 1 nanometer to hundreds of nanometers. During operation, a pre-selected potential difference is applied between an electron emitter and its corresponding gate, such as between electron emitter 102 and circular gate 103 surrounding it. Due to the sharp point of the emitter, an electron beam current is extracted from the emitter towards the storage area. Depending on the distance between the emitters and the storage medium 106, the type of emitters, and the spot size (bit size) required, electron optics may be utilized to focus the electron beams. A voltage may also be applied to the storage medium 106 to either accelerate or decelerate the field-emitted electrons or to aid in focusing the field-emitted electrons.

In one embodiment, casing 120 maintains storage medium 106 in a partial vacuum, such as at least $10^{-5}$ torr. It is known in the art to fabricate such types of microfabricated electron emitters in vacuum cavities using semiconductor processing techniques. See, for example, "Silicon Field Emission Transistors and Diodes," by Jones, published in IEEE Transactions on Components, Hybrids and Manufacturing Technology, 15, page 1051, 1992.

In one embodiment shown in FIG. 1, each electron emitter has a corresponding storage area. In another embodiment, each electron emitter is responsible for a number of storage areas. As micromover 110 moves storage medium 106 to different locations, each emitter is positioned above different storage areas. With micromover 110, an array of electron emitters can scan over storage medium 106.

Micromover 110 can take many forms, as long as it has sufficient range and resolution to position the electron emitters over the storage areas. In one conceptual example, micromover 110 is fabricated by standard semiconductor microfabrication process to scan storage medium 106 in the X and Y directions with respect to casing 120.

As will be described, the electron emitters operate to read and write information on the storage areas by means of the electron beams they produce. Thus, electron emitters suitable for use in storage device 100 are of the type that can produce electron beams that are narrow enough to achieve the desired bit density on the storage medium, and can provide the power density of the beam current needed for reading from and writing to the medium. A variety of methods are known in the art that are suitable to make such electron emitters. For example, one method is disclosed in "Physical Properties of Thin-Film Field Emission Cathodes With Molybdenum Cones," by Spindt et al, published in the Journal of Applied Physics, Vol. 47, No. 12, December 1976. Another method is disclosed in "Fabrication and Characteristics of Si Field Emitter Arrays," by Betsui, published in Tech. Digest 4$^{th}$ Int. Vacuum Microelectronics Conf., Nagahama, Japan, page 26, 1991.

In one embodiment, there can be a two-dimensional array of emitters, such as 100 by 100 emitters, with an emitter pitch of 50 micrometers in both the X and the Y directions. Each emitter may access bits in tens of thousands to hundreds of millions of storage areas. For example, the emitters scan over the storage areas with a periodicity of about 1 to 100 nanometers between any two storage areas. Also, all of the emitters may be addressed simultaneously or in a multiplexed manner. Such an accessing scheme significantly reduces access time, and increases data rate of the storage device.

Figure 2:
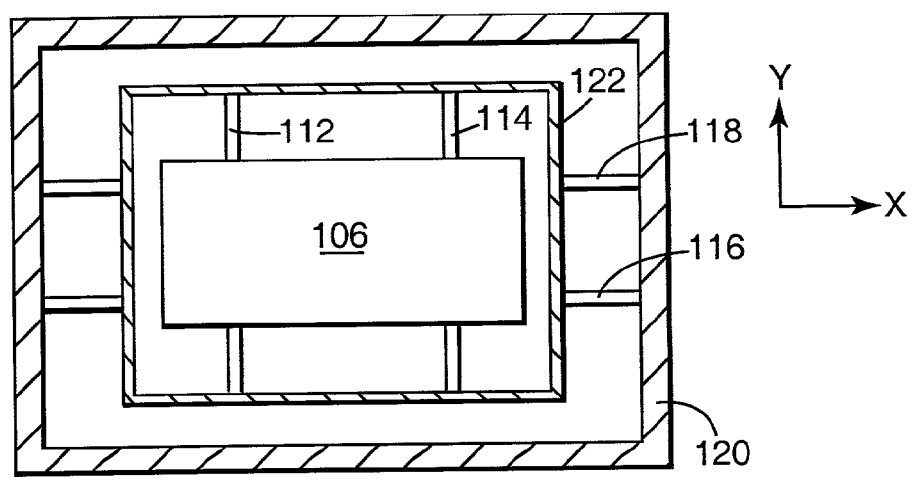
FIG. 2 is a top cross-sectional view of the storage device of FIG. 1 taken along lines 2—2.

FIG. 2 shows the top view of the cross section 2—2 in FIG. 1, illustrating storage medium 106 and photodiode 109 held by two sets of thin-walled microfabricated beams. The faces of the first set of thin-walled beams are in the Y-Z plane, such as 112 and 114. Thin-walled beams 112 and 114 may be flexed in the X direction allowing storage medium 106 to move in the X direction with respect to casing 120. The faces of the second set of thin-walled beams are in the X-Z plane, such as 116 and 118. Thin-walled beams 116 and 118 allow storage medium 106 to move in the Y direction with respect to casing 120. Storage medium 106 is held by the first set of beams, which are connected to frame 122. Frame 122 is held by the second set of beams, which are connected to casing 120. The electron emitters scan over storage medium 106, or storage medium 106 scans over the field emitters in the X-Y directions by electrostatic, electromagnetic, piezoelectric, or other means known in the art. In this example, micromover 110 moves storage medium 106 relative to the electron emitters. A general discussion of such microfabricated micromover can be found, for example, in "Novel Polysilicon Comb Actuators for XY-Stages," published in the Proceeding of MicroElectro Mechanical Systems 1992, written by Jaecklin et al.; and in "Silicon Micromechanics: Sensors and Actuators on a Chip", by Howe et al., published in IEEE Spectrum, page 29, in July 1990.

Figure 3:
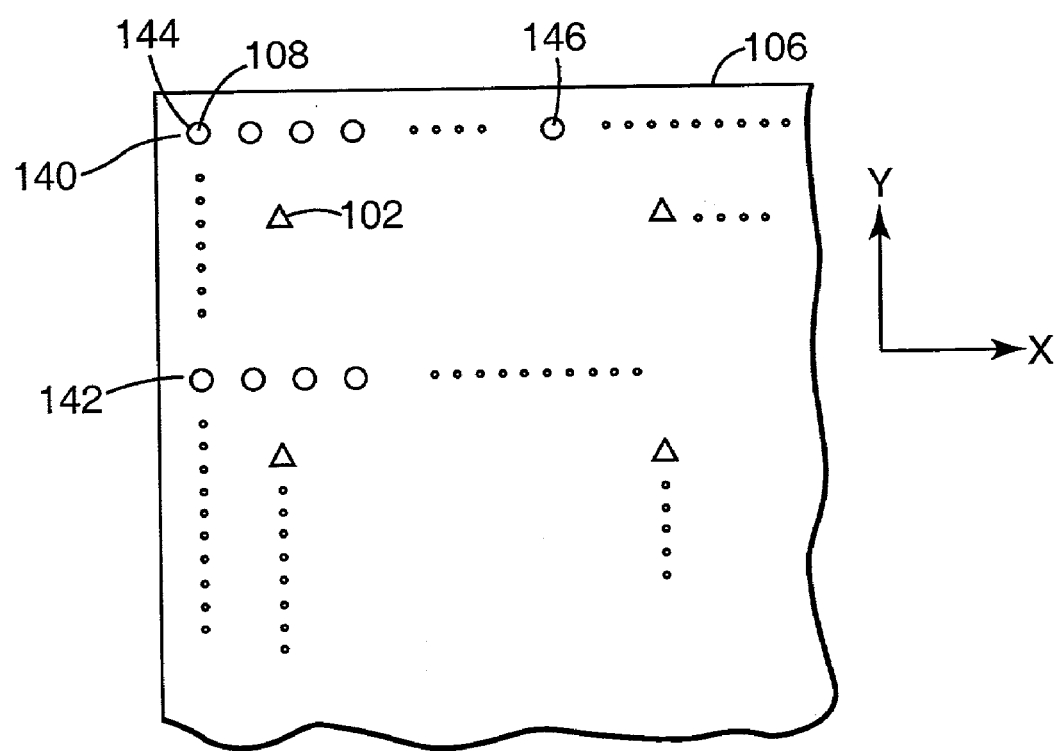
FIG. 3 is a top view illustrating one exemplary embodiment a portion of the storage medium of the storage device of FIG. 1.

FIG. 3 is a top view illustrating one exemplary embodiment of a portion of storage medium 106 having a two-dimensional array of storage areas and a two-dimensional array of emitters. The storage areas are addressed using external circuits. In one embodiment, to reduce the number of external circuits, the storage medium is separated into rows, such as rows 140 and 142, where each row contains a number of storage areas. Each emitter is responsible for a number of rows. However, in this embodiment, each emitter is not responsible for the entire length of the rows. For example, emitter 102 is responsible for the storage areas within rows 140 through 142, and within columns 144 through 146. All rows of storage areas accessed by one emitter are connected to one external circuit. To address a storage area, the emitter responsible for that storage area is activated and micromover 110 (shown in FIG. 1) moves that emitter to that storage area. The external circuit connected to the rows of storage areas within which that storage area lies is also activated.

In one method, writing is accomplished by temporarily increasing the power density of the electron beam current to modify the surface state of the storage area. Reading is accomplished by measuring the effect of the storage area on the electron beams or the effect of the electron beams on the storage area by detection of the magnitude and/or power density of a cathodoluminescence signal detected by the photodiode 109. For example, a storage area that has been modified can represent a bit 1, and a storage area that has not been modified can represent a bit 0, and vice versa. In fact, the storage area can be modified to different degrees to represent two or more bits. Some modifications may be permanent, and some modifications may be reversible. The permanently modified storage medium is suitable for write-once-read-many memory (WORM).

The storage medium is made of a material which provides a cathodoluminescence signal when exposed to an electron beam from an electron emitter. In one embodiment, the storage medium is made of phase change material. During a write operation, the structure of the storage area is altered in such a way as to vary its cathodoluminescence properties. The term cathodoluminescence, as used herein, is defined as the light emission associated with the excitation of materials by an electron beam. In one aspect, cathodoluminescence is the light emitted by the storage medium as a result of electron bombardment in the approximate wave length range 160–2000 nm. 400–800 nm is the visible regime. Wave lengths shorter than this are in the ultraviolet spectrum and longer than this in the infrared spectrum. Cathodoluminecense is emitted from a generation volume after any optical absorbtion and internal reflection processes have taken place. Reading is accomplished by using the photodiode to detect the cathodoluminescence signal when a lower power density electron beam is applied to storage medium 106. During reading, the power density of the electron beam is kept low enough so that no further writing occurs.

One embodiment of storage medium 106 includes a material whose structural state can be changed from crystalline to amorphous by electron beams. The amorphous state has different cathodoluminescence properties which leads to a difference cathodoluminescence signal being detected via the photodiode when the low power density electron beam is applied to the storage area. By measuring the magnitude and/or power density of the cathodoluminescence signal, the state of the storage area can be determined. To change the material from the amorphous to crystalline state, the electron beam power density is first increased and then slowly decreased. This process heats the amorphous and then slowly cools it so that the area has time to anneal into its crystalline state. To change the material from crystalline to amorphous state, the beam power density is increased to a high level and then rapidly decreased. To read from the storage medium, a lower-energy beam is focused on a desired storage area. An example of such a type of material is germanium telluride (GeTe) and ternary alloys based on GeTe. Similar methods to modify states using laser beams as the heating source have been described in "Laser-induced Crystallization of Amorphous GeTe: A Time-Resolved Study," by Huber and Marinero, published in Physics Review B 36, page 1595, in 1987, and will not be further described here. Another suitable material is a Ge—Sb—Te ternary alloy. Other suitable phase change materials and methods are discussed in "Erasable Phase-Change Optical Materials," MRS Bullentin, Noboru Yamada, September 1996 and "Overwriteable Phase-Change Optical Disk Recording," IEEE Transactions on Magnetics, Vol. 34, No. 2, March 1998. Other suitable methods and materials will become apparent to one skilled in the art after reading the present application.

In one embodiment, the storage medium has a thickness between 25 and 1000 nanometers (e.g., electrons will penetrate from 25 to 1000 nm at 1,000 to 30,000 ev energy). It will be readily apparent to those skilled in the art that this thickness range may be extended by increasing the energy of the electrons emitted from the electron emitter and/or by reducing the optical absorbtion coefficient of the storage medium at the wave length of interest.

Other methods can also be used to induce a state change in storage medium 106. For example, a change in the topography of the medium, such as a hole or bump, will modify the cathodoluminescence signal of the storage medium. This modification occurs because the power density of the cathodoluminescence depends on the material properties as the electron beam is exposed to (e.g., passes through) the storage area. Other changes in material properties, band structure, and crystallography may also affect the cathodoluminescence signal.

Figure 4:
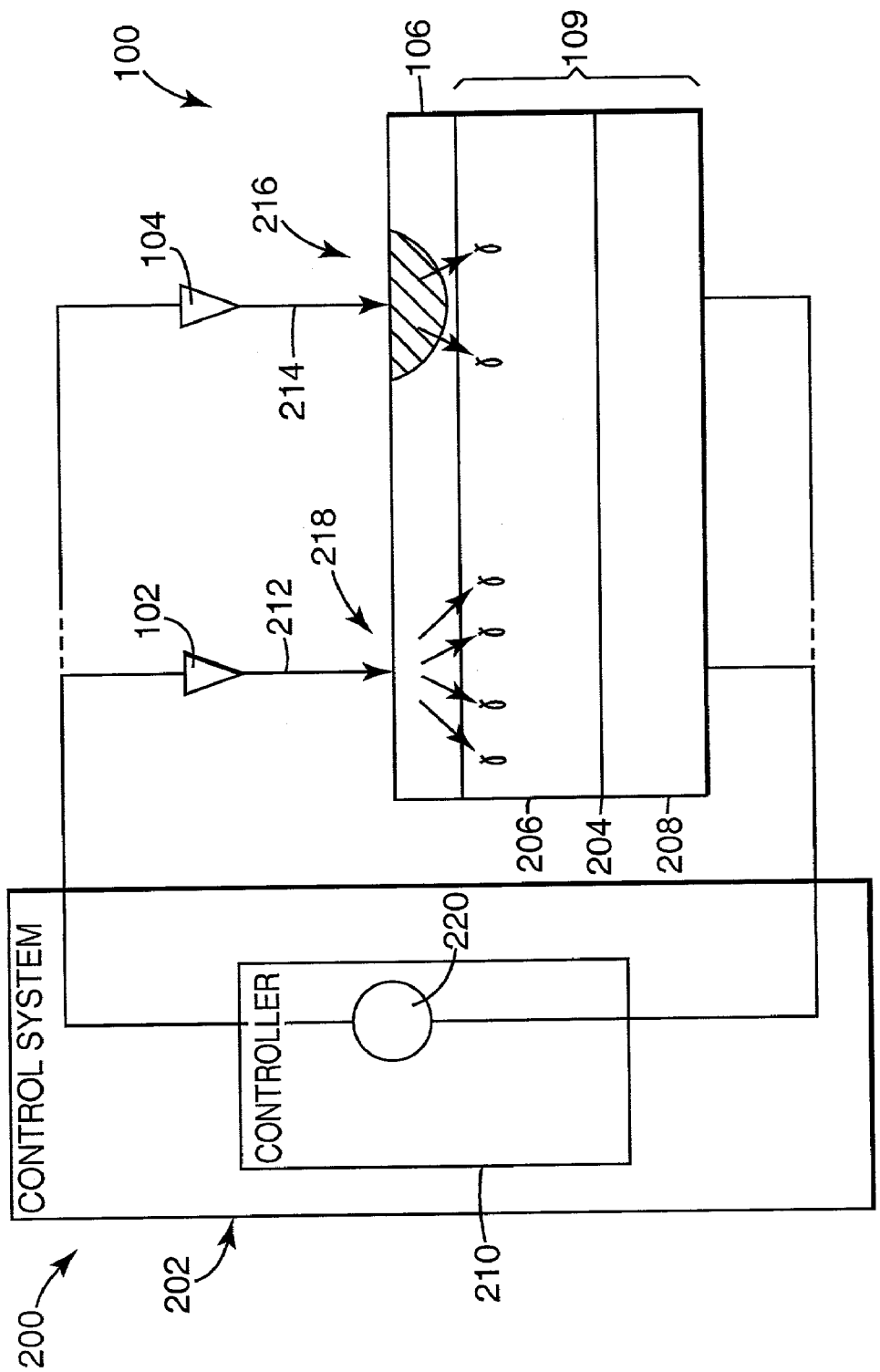
FIG. 4 is a diagram illustrating one exemplary embodiment of a storage system according to the present invention including electron emitters writing to storage areas in a storage device.

FIG. 4 is a diagram illustrating one exemplary embodiment of a storage system 200 employing a storage device according to the present invention. The storage system 200 includes control system 202 and storage device 100. For ease of discussion, only electron emitters 102, 104, storage medium 106 and photodiode 109 of storage device 100 are illustrated. Control system 202 or portions of control system 202 may be located on the same semiconductor component and be part of storage device 100.

FIG. 4 illustrates one exemplary embodiment of writing information to storage device 100. Storage medium 106 is made of a phase change material having material properties similar to those previously described herein. Storage medium 100 is in light communication with photodiode 109. In one embodiment, storage medium 106 is positioned adjacent photodiode 109. In one aspect, storage medium 106 is a thin layer of phase change material which is coated or deposited onto photodiode 109. In another embodiment, photodiode 109 is in light communication with a surface of storage medium 106 (e.g., adjacent the electron emitter) for detecting a portion of the cathodoluminescence signal emitted from the surface of the storage medium. The cathodoluminescence signal may be received via a mirror system and/or lens system.

Photodiode 109 is a P-N junction diode, indicated by P-N junction 204, wherein layer 206 is a p-layer and layer 208 is an n-layer, or alternatively layer 206 is an n-layer and layer 208 is a p-layer.

During a write operation, controller 210 is operated to temporarily increase the power density of the electron beam current 212, 214 to modify the surface state of the storage medium 106. In one embodiment, controller 210 includes a constant current source 220 for controlling the power density of electron beam 212, 214.

A modified storage area is illustrated at 216, and a storage area that has not been modified is illustrated at 218. In one embodiment, the storage medium 106 including unmodified storage area 218 is in a first or crystalline state. To change the phase change material from a crystalline to amorphous state indicated by modified storage area 216, the electron beam 214 power density is increased to a high level then rapidly decreased. In one embodiment, the properties of the phase-change material making up storage medium 106 are such that the material properties can be reversibly changed from amorphous state to a crystalline state by heating and cooling it at the proper rate. For example, to change modified storage area 216 from the amorphous to crystalline state, the power density of electron beam 214 is first increased and then slowly decreased. This process heats the amorphous area and then slowly cools it so that the modified amorphous area 216 has time to anneal into its crystalline state.

Figure 5:
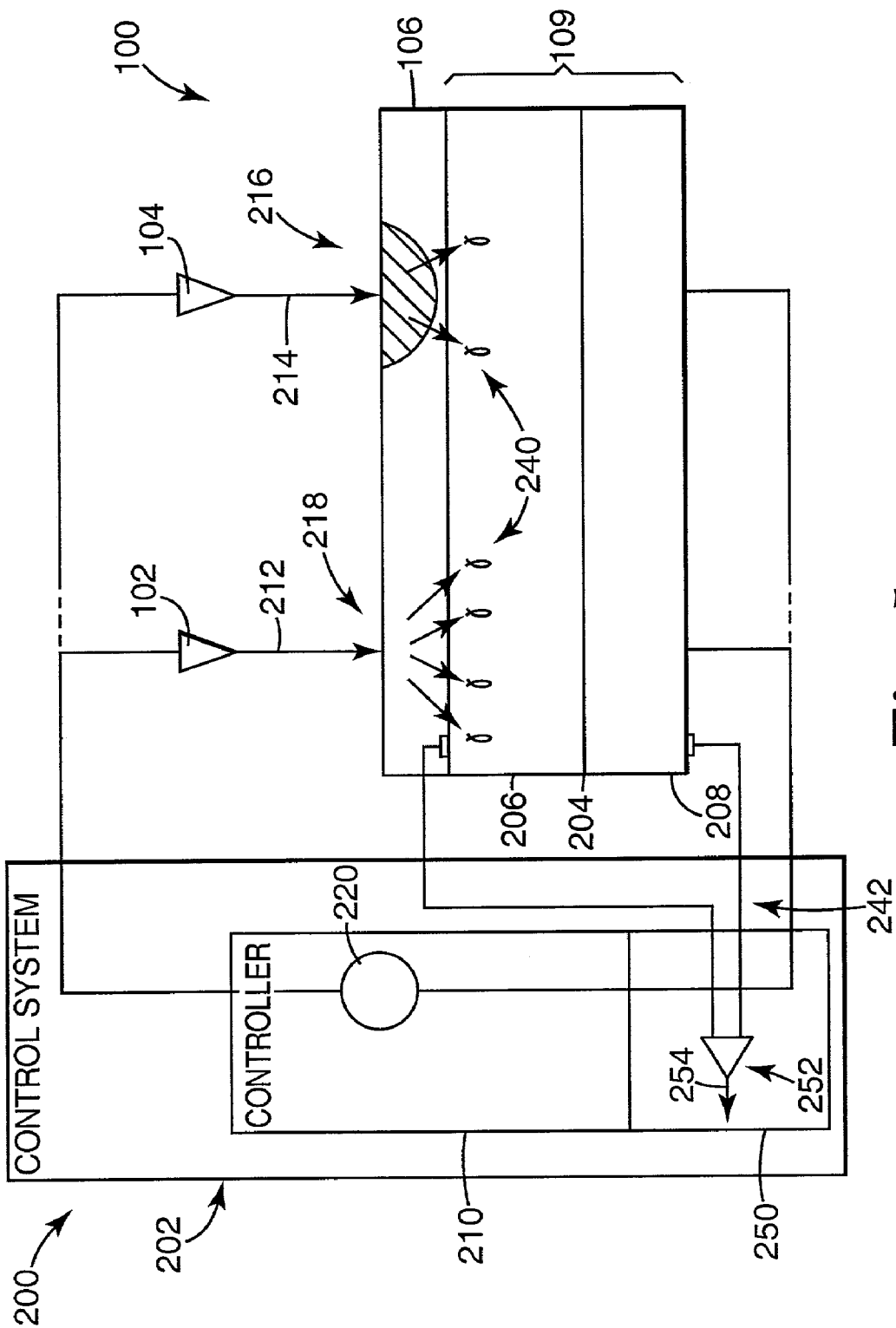
FIG. 5 is a diagram illustrating one exemplary embodiment of a storage system according to the present invention including reading from storage areas of a storage medium.

FIG. 5 is a diagram illustrating one exemplary embodiment of reading information from storage device 100. Reading is accomplished by applying a lower power density electron beam to storage medium 106. During reading, the power density of the electron beam (e.g., 212, 214) is kept low enough such that no writing occurs or altering of the state of storage medium 106. During a read operation, a cathodoluminescent signal is produced from storage medium 106. The cathodoluminescent signal is representative of the information stored on storage medium 106, indicated at 240. The cathodoluminescent signal 240 is detected by photodiode 109, which provides a corresponding output signal 242 to control system 202. The photodiode may be used in photovoltaic or a photoconductive mode. In one embodiment, control system 202 includes a measuring circuit 250 which receives the output signal 242 and provides a corresponding signal to controller 210 for reading the information on storage medium 106. In one aspect, measuring circuit 250 includes an amplifier circuit 252. In one embodiment, the amplifier circuit 252 is a transimpedance amplifier circuit which receives a current input signal 242 at its input terminals from photodiode 109 and provides a corresponding output voltage signal 254 to controller 210 representative of the information stored on storage medium 106.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A storage device comprising:
    an electron emitter;
    a storage medium in close proximity to the electron emitter, the storage medium including a phase change material; and
    a read signal detector capable of detecting light in communication with the storage medium.

2. The storage device of claim 1, wherein the read signal detector includes a photodiode.

3. The storage device of claim 1, further comprising a measuring circuit coupled to the read signal detector.

4. A storage device comprising:
    an electron emitter;
    a storage medium in close proximity to the electron emitter, the storage medium including a phase change material; and
    a cathodoluminescence read signal detector in light communication with the storage medium.

5. The storage device of claim 4, wherein the storage medium is disposed adjacent the cathodoluminescence read signal detector.

6. The storage device of claim 4, wherein the storage medium is deposited on the cathodoluminescence read signal detector.

7. The storage device of claim 4, wherein the storage medium is coated onto the cathodoluminescence read signal detector.

8. The storage device of claim 4, wherein the storage medium has a thickness between 25 and 1,000 nanometers.

9. The storage device of claim 4, further comprising a measuring circuit coupled to the cathodoluminescence read signal detector.

10. The storage device of claim 9, wherein the measuring circuit includes an amplifier.

11. The storage device of claim 4, wherein the phase change material includes Ge-Sb-Te.

12. The storage device of claim 4, wherein the phase change material is a Ge-Sb-Te ternary alloy.

13. The storage device of claim 4, further comprising a micromover to change the relative positions between the electron emitter and the storage area.

14. The storage device of claim 4, wherein the cathodoluminescence read signal detector is a photodiode.

15. A storage device comprising:
    an electron emitter capable of generating an electron beam current;
    a storage medium in close proximity to the electron emitter, the storage medium comprising a phase change material including Ge-Sb-Te having cathodoluminescence properties, the phase change material having a thickness between 25 and 1,000 nanometers and having a first state and a second state for storing information, wherein the first state is a crystalline state and the second state is an amorphous state; and
    a photodiode in light communication with the storage medium, wherein when the storage medium is exposed to the electron beam current, the photodiode is configured to receive a cathodoluminescence signal representative of whether the storage medium is in the first state of the second state.

16. The storage device of claim 15, further comprising a measuring system which receives an output signal from the photodiode representative of whether the storage medium is in the first state or the second state.

17. A storage system comprising:
a nonvolatile storage device comprising an electron emitter which generates an electron beam current, a storage medium in close proximity to the electron emitter, wherein the storage medium is made of a phase change material, and a photodiode in light communication with the storage medium; and
a control system in communication with the nonvolatile storage device for reading and writing data to the storage device.

18. The storage system of claim 17, the storage system having a write mode and a read mode, wherein in the write mode the control system operates to control the magnitude of the power density of the electron beam current generated from the electron emitter to change a storage location on the storage medium between a first state and a second state to store information at the storage location.

19. The storage system of claim 18, further where in the read mode, the control system controls the magnitude of the power density of the electron beam current generated form the electron emitter to provide a cathodoluminescence signal to the photodiode representative of the information stored on the storage medium.

20. The storage system of claim 19, where in the read mode the magnitude of the power density of the electron beam current is less than the magnitude of the power density of the electron beam current in the write mode.

21. The storage system of claim 19, the control system further comprising a measuring circuit coupled to the photodiode which receives an output signal representative of the cathodoluminescence signal.

22. The storage system of claim 17, where at least a portion of the control system is located on the same semiconductor chip as the storage device.

23. A storage system comprising:
a control system; and
an array of storage devices configured to communicate with the storage system, each storage device including an array of electron emitters fabricated by semiconductor microfabrication techniques capable of generating electron beams, a storage medium having medium partitions, and a plurality of micromovers wherein each micromover is operable to move a media partition relative to one or more electron emitters for reading and writing data at the media, and a photodiode positioned at each media partition for reading data stored at the media partition.

24. A method of manufacturing a storage device using semiconductor techniques comprising:
positioning an electron emitter in close proximity to a phase change medium on the storage device;
configuring a micromover for moving the electron emitter relative to the medium; and positioning a cathodoluminescence signal detector in light communication with the phase change medium.

25. A method of reading information from a semiconductor storage device comprising:
positioning an electron emitter having an electron beam in close proximity to a phase change storage medium having information stored thereon via storage areas in a first state or second state;
moving the electron emitter over a storage area;
detecting a cathodoluminescence signal from the phase change storage medium representative of whether the storage area is in the first state or the second state.

* * * * *